Jan. 18, 1966     I. J. SOBEL     3,230,439
BATTERY CHARGING SYSTEMS
Filed May 7, 1962     2 Sheets-Sheet 1
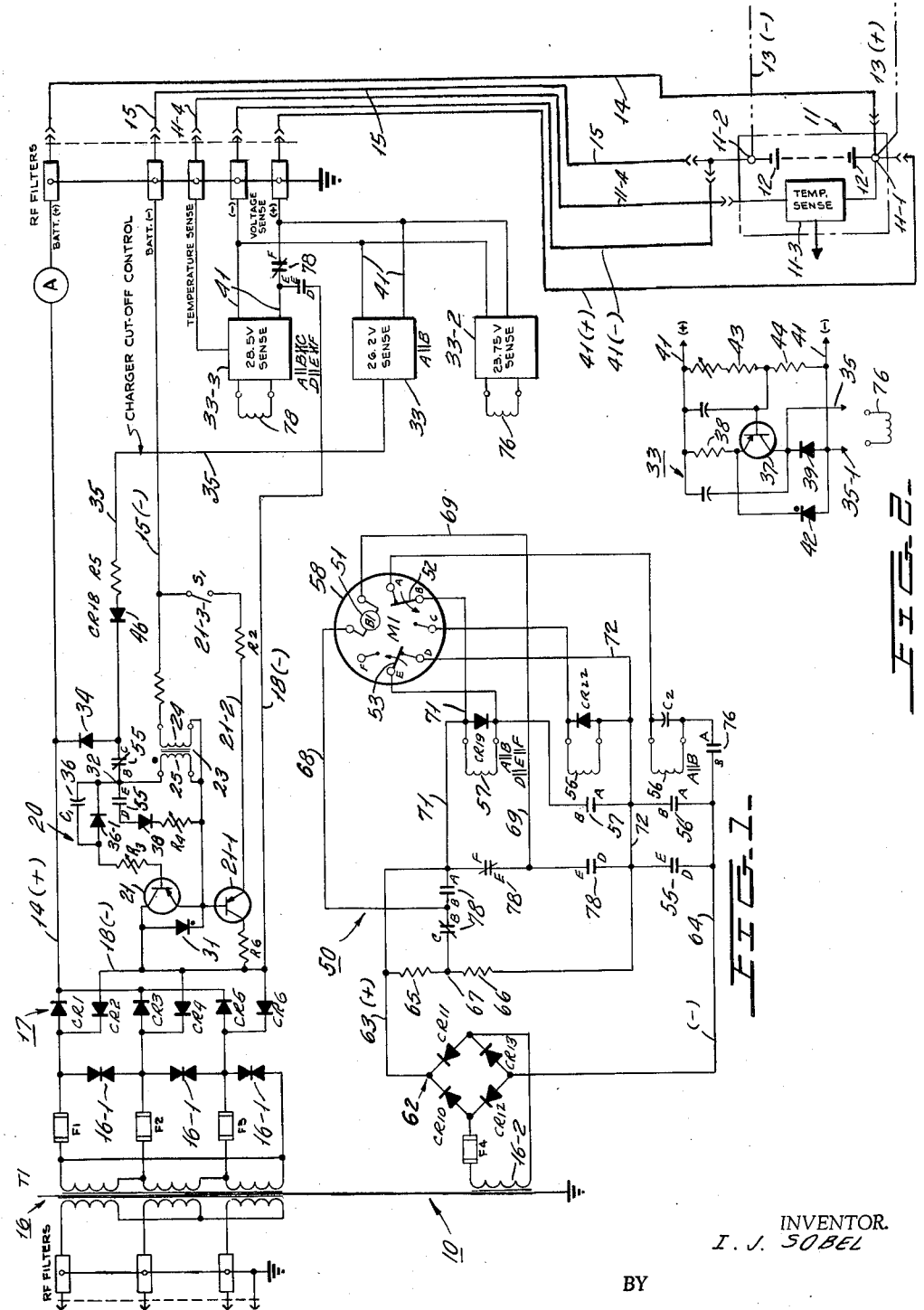
INVENTOR.
I. J. SOBEL
BY
OSTROLENK, FABER, GERB & SOFFEN
ATTORNEYS

FIG. 3.

| TRUTH TABLE | | TRICKLE | START CHARGE (FROM TRICKLE) | MAIN CHARGE | TOPPING CHARGE |
|---|---|---|---|---|---|
| | | T1 | T2 | T3 | T4 |
| 78 | A-B | O | O | O | X |
| | B-C | X | X | X | O |
| | D-E | O | O | O | X |
| | E-F | X | X | X | O |
| 55 | A-B | O | O | X | X |
| | B-C | X | X | O | O |
| | D-E | O | O | X | X |
| 56 | A-B | O | X | O | O |
| 76 | A-B | O | X | O | O |
| 57 | A-B | O | O | O | O |
| | D-E | O | O | O | O |
| | E-F | O | O | O | O |
| 58 (TIMER) | A-B | X | X | O | O |
| | B-C | O | O | X | X |
| | D-E | O | O | O | O |

INVENTOR.
I. J. SOBEL
BY
OSTROLENK, FABER, GERB & SOFFEN
ATTORNEYS

United States Patent Office 3,230,439
Patented Jan. 18, 1966

3,230,439
BATTERY CHARGING SYSTEMS
Ilyitch Jacob Sobel, Hartsdale, N.Y., assignor to Sonotone Corporation, Elmsford, N.Y., a corporation of New York
Filed May 7, 1962, Ser. No. 192,936
1 Claim. (Cl. 320—51)

This invention relates to systems for charging electric batteries which are used for supplying direct current to a load circuit. Although it also has other applications, the charging system of the invention was evolved for use in recharging more or less discharged batteries consisting of battery cells having characteristics of the type represented by commercially used nickel-cadmium cells, which in being recharged reach an initial higher voltage level when one-polarity electrode of each cell has been fully recharged without the opposite-polarity electrodes having been fully charged. Such battery cells require a further follow-up or topping charge to bring the cell to the fully recharged voltage level at which the electrode material of the referred to opposite-polarity cell electrodes has been converted to the fully charged condition.

Among the objects of the invention is a battery charging system of the foregoing type which—in response to a drop of the battery voltage by partial large or full discharge—is activated to first supply to the battery an initial charge required to raise its voltage to an initial voltage level such as the voltage level corresponding to a Ni-Cd cell wherein one polarity electrode has been fully recharged while the opposite-polarity cell electrode is only partially discharged; which charging systems also totalize the initial charge energy so supplied to the battery, and in response to completing the totalized initial or main charging operation starts a predetermined follow-up or topping charge operation wherein the opposite polarity electrodes of the battery cells are fully recharged.

The foregoing and other objects of the invention will be best understood from the following description of exemplifications thereof, reference being had to the accompanying drawings, wherein:

FIG. 1 is a circuit diagram of one form of battery charging system exemplifying the invention;

FIG. 2 is a circuit diagram of one of the control units of the charging system of the invention shown in FIG. 1 which corresponds to two other generally similar control circuit units as hereinafter explained;

FIG. 3 is the Truth Table listing in successive lines of the first row the different control switch contacts of the system of FIG. 1 and giving in successive rows the operating condition of the listed different switch contacts for different operating conditions of the system identified by the legend on the top of each row.

The description of the systems of the invention and of their component elements given herein conforms to accepted military standards known as MIL–STD–130. In accordance with such accepted standards, an individual pair of cooperating switch contacts of a relay for instance will be shown by a pair of adjacent short vertical lines, the respective switch pair lines being labeled by two letters, such as AB or CD and a three contact switch will be shown by two pairs of contacts, such as AB and BC, where contact B makes contact with either contact A or C. A closed pair of switch contacts is indicated by a diagonal line crossing the pair of adjacent lines of the contact pair.

In accordance with the MIL–STD–130 standards, all relays and switches are shown in non-operated condition.

The specific charging system described in connection with FIGURES 1 and 2 represents one specific example of the invention designed to maintain charged an airborne battery system and to operate from −20° F. to +160° F. up to 60,000 feet altitude.

Referring to FIGURE 1, a storage battery 11, consisting of a number serially connected battery cells 12 is arranged to supply direct-current to a load (not shown) through two load leads indicated by dash-dot lines 13. For sake of reliability, nickel-cadmium battery cells 11 are used. In the specific example, sufficient cells 11 are connected in series to provide a normal battery D.C. output voltage or 26.2 volts. To recharge the battery after it has been partially or fully discharged and to maintain at all other times in fully charged condition, the opposite polarity battery terminals, namely (+) terminal 11–1 and (−) terminal 11–2 are arranged to have connected thereto two opposite polarity charging conductors consisting of positive charge conductor 14 and negative charge conductor 15 of a recharging circuit generally designated 10.

Charging power is supplied from a three-phase A.C. power supply having three power supply conductors, to which are connected the three primary windings of a three-phase transformer 16 for delivering through its three-phase secondary windings A.C. power of proper voltage to a conventional rectifier system 17 for supplying the required rectified D.C. charging current to the two opposite-polarity charging conductors 14, 15.

The specific charger of FIGURE 1 was designed to recharge a 13 ampere hour instrumentation battery consisting of Ni-Cd cells at a constant current rate. Its recharging procedure is such as to assure that it fully charges the battery under all circumstances of cycling. It takes care of the specific requirements presented by the characteristics of nickel-cadmium battery cells. In such battery cell the active material of the positive electrode plates is composed of nickel (II) hydroxide

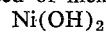

Ni(OH)$_2$ which on being fully charged is converted into nickel (III) hydroxide NiO(OH). The active material of the charged negative plate is composed of metallic cadmium which becomes cadmium hydroxide during the discharge. The efficiency of charge acceptance of these opposite polarity plates are substantially different. The negative plate becomes reduced to metallic cadmium at a more efficient rate than does the oxidation change of the nickel hydroxide positive plate. To fully charge a cell all the nickel (II) hydroxide Ni(OH)$_2$ of the nickel oxide plate must be transformed into the charged state of nickel (III) hydroxide NiO(OH). To accomplish this, energy must be supplied to the battery beyond the time that the active negative plate material has been fully converted to metallic cadmium. The complete transformation of the cadmium hydroxide to cadmium causes the characteristic terminal voltage of such cell to rise to 1.5 volts per cell at room temperature. A further slow rise from 1.5 volts to approximately 1.65 to 1.68 volts per cell continues beyond this point when fully charging the nickel oxide compounds of the positive plate.

A constant potential charging system cannot secure such full cell charging, since it is pegged to the 1.5 volts or at best to 1.6 volts per cell. Accordingly it would not charge the battery beyond the point where the cadmium (negative) plate is fully charged and would leave the nickel oxide positive plate only partially charged. To properly and fully charge the positive nickel hydroxide plate requires that 30 to 40% additional charge energy be delivered to the battery cell after the terminal voltage has risen to 1.5 volts per cell. The battery charging system of the present invention meets these difficulties and assures that each of the opposite polarity electrodes of Ni–Cd batteries are fully charged.

In accordance with the invention, the charging circuit is designed to charge the Ni–Cd battery at constant-current rate, and the charging operation is controlled by totalizing means 50 which is set into operation by sensing means responsive to dropping battery voltage to start and totalize a main charging cycle wherein the battery voltage is raised to a level corresponding to an initial recharging state, such as, corresponding to 1.5 volts per cell. After so completing the main charging cycle the charging continues under the control of the totalizing means 50 for a follow-up topping cycle which is a predetermined fraction of the preceding main charging cycle, which topping cycle operates to assure that upon its completion the positive plates of the battery are fully charged, and then cause termination of the recharging operation with the termination of the topping cycle. In practicing the invention, good results are obtained by making the topping charge cycle one half of the main charge cycle.

In the specific charging system of the invention shown in FIG. 1, charge totalizing means 50 shown totalizes or times the constant current main charge supplied to the battery up to the point where the battery has reached 1.5 volts per cell. Upon completion of the main charge totalizing action, the charge totalizing means is arranged to be automatically actuated to totalize a further topping charge supplied to the battery, which topping charge is a predetermined fraction of the preceding totalized main charge supplied to the battery. Since the charging current is constant, a simple charge timing means 50 will perform the charge totalizing action. The charge totalizing or timing means 50 of FIG. 1 has two cams which perform one forward rotation which totalizes the main charge supplied to the battery. At the end of the main charge totalizing action corresponding to the end of the forward rotation of timer 50 and its cams, it operates associated switch means to rotate the charge totalizing timer in opposite direction in a predetermined time fraction of its forward rotation for totalizing the further predetermined topping charge supplied to the battery. This totalized topping charge is of such predetermined magnitude as to bring the battery to the fully charged state. Instead of opposite rotation of charge totalizing, timer 51 may be returned to its initial state or position by further rotation at the higher speed in the same direction.

As an example let us consider that 4 ampere hours has been removed from the battery. The 19 cell battery may now be down to about 23 volts. This voltage is sensed by the internal logic of the battery charging system of the invention and causes the primary or main charge cycle to be initiated, assuming that during the primary or main charge cycle of this example, an average current of approximately 3.5 amps., equivalent to 7 amp. peak is delivered to the battery. The main lapsed charging time is totalizing by the forward direction of the control cams which are moved with the timer. As the battery accepts charge, and the negative cadmium plate becomes fully charged, the raised voltage of 1.5 volts per cell of the battery is sensed by the charger.

This 1.5 volts/cell point is modified by the temperature sensitive elements which are attached to the bulkheads of the battery. This provides for a lower voltage transition to the topping charge mode when the battery temperature is high and for a higher transition voltage when the battery is subjected to low temperature extremes. This assures compensation for temperature changes between the high and low end of the temperature range under which the battery has to operate.

At the transition point of 1.5 volts/cell (at normal ambient temperature) logic elements in the charger reverse the totalize or timer cams and proceed to drive them at 2½ times the forward speed. During this topping charge period the charger delivers the same 3.5 ampere constant current, 7 amp. peak current. Because the timer cams return to their original position in 40% of the normal charge mode time, a 40% topping charge is delivered to the battery during this period. The topping charge thus provides a fully charged positive plate in the battery. The timer mechanism is self adjusting to the amount of energy removed from the battery during the previous discharge. When the battery is subjected to a short discharge the time accumulated in the primary mode is short and the topping charge mode is correspondingly short. When considerable energy is removed from the battery, the topping charge, likewise, is considerably longer as it always follows the primary mode in a ratio of 40% to the primary mode.

The method for constant current control is used to provide a pulse-width regulation of the charging current of the system. This system provides for a minimum of parts to achieve a ±10% regulation of the required average constant-current charge. In the specific system shown, the operation of auxiliary switch 32 causes the delivery of a 7 ampere average 15 ampere peak charge from the charger to the battery 12. The on to off time ratio of the regulating circuit is inversely proportional to the difference between the D.C. output voltage from the three-phase rectifier source and the battery voltage. If the line voltage should climb, the driving voltage around the charging loop is reduced, the pulse width increases maintaining the same average current flow to the battery. As an example, when the charger is adjusted to the 7 amp. peak charging rate 3.5 amp. average rate, it will require 5.1 hours to charge a fully discharged battery.

In addition to its main charging mode and its topping charging mode, the charging system of FIGURE 1 also operates with a trickle charging mode for maintaining the battery 11 fully charged while it floats across the two battery load leads 13 without delivering load current.

Across each of the three secondary windings of transformer 16 is connected a protective shunt 16–1 to provide a shunting bypass for high voltage transients induced therein and suppress damage to the components of the charging system. The protective shunts 16–1 may consist of commercially available devices such as supplied by the General Electric Company under the trademark "Thyrector" and consisting of two back-to-back connected Zener-type selenium rectifier junctions which block flow of current below the normal rectifier D.C. voltage delivered to the two charge conductors 14, 15. A conventional three-phase rectifier system 17 including rectifier set CR1, CR3, CR5 and opposite polarity rectifier set CR2, CR4, and CR6 rectify the three-phase alternating current supplied by transformer 16 and deliver rectified direct current to the battery charging circuit having a positive charge conductor 14 marked (+) and a negative rectifier or charge lead 18 marked (−).

The transformer 16 has also an additional secondary winding 16–2 which supplies through a conventional rectifier bridge 62 rectified current to two opposite polarity conductors 63, 64 marked with (+) and (−) signs respectively which serves to energize the charge totalizing timer mechanism 50 and associated relay means 55, 56 and 57 of the later described charge controls. In the specific system of FIGURE 1, the charge totalizing timer 50 has a timer motor 51 which rotates two cams (not shown). One timer cam actuates switch 52 to connect contacts A and B throughout the main charging cycle and may have in its intial starting position a cam recess which releases switch 52 from the contact A position shown to the operated contact C position when the energized motor 51 starts rotating its two cams. The second timer cam maintains switch 53 in open-D contact position under all conditions except for releasing it for a short moment by a cam recess to the operated contact D position thereby momentarily establishing circuits which reverse the direction of rotation of and return the two timer cams at higher topping-charge speed to the original non-operated position shown in FIGURE 1. As soon as timer motor 51 starts returning the momentarily operated cam switch 53 is returned to its open-D contact position while the other cam switch 52 remains in the operated contact C position until at the end of the full topping charge the two cams have been returned to their original positions.

The leads from the secondary windings of supply transformer 16 include radio-frequency filters F1 to F4 which provide filtration to suppress radio frequency interference with the charging system. Special care in bonding the outer shields (not shown) on the charger is provided. Furthermore, the charger has no inherently noisy circuitry that could be affected by radio-frequency interference. A 20 ampere full scale meter A in the charge lead 14 serves to monitor the average charging current to the battery 11. A battery temperature sense circuit senses the battery temperature and will determine the point of transition to properly provide the topping charge period required by the logic system. The charger is designed to operate from 3 phase 400 cycle ±10 cycle 115 volts ±10% line to neutral. The charger system exemplifying the invention and shown in FIGURE 1 is designed to charge a battery having nineteen nickel-cadmium battery cells. The charger uses a Zener-diode controlled reference voltage to provide high degree of charge regulation.

The positive charge conductor 14 connects the positive battery terminal 11 directly to the positive output terminal of the rectifier 17. The negative terminal 11–2 of the battery is connected to negative rectifier terminal 18 (—) of charging-power rectifier system 17 through negative charging conductor 15 and the saturable-transformer-core transistor oscillator generally designated 20 which provides pulse-width regulation of the required constant charging current pulses delivered to battery 11. In the form shown the saturable core oscillator 20 comprises a conventional semi-conductor junction transistor 21 having the base, emitter and collector electrodes, and saturable transformer core transformer 23 having a primary winding 24 and a secondary winding 25. The collector of transistor 21 is connected to the minus rectified input terminal 18 (—) and its emitter is connected through a lead to interconnected ends of the associated two transformer windings 24, 25.

The primary transformer winding 24 of the saturable core transformer 23 is connected through negative charging conductor 15 to the negative battery terminal 11–2 of the battery 11. Across the emitter and collector of transistor 21 is connected a Zener diode 31 which provides the controlled reference voltage for the regulation of the charging current. The emitter of transistor 21 is also connected through lead 27 and secondary transformer winding 25 to circuit portion 32 which is connected by contacts BC of a control relay means 55 (described later) and a rectifying junction diode 34 to the positive charge input lead 14. The base of oscillator transistor 21 is connected through a circuit including adjustable resistor R3 and rectifying diode 36–1 shunted by capacitor 36 to the circuit portion 32 through which the secondary transformer winding 25 is connected by diode 34 to the positive charge conductor 14.

To simplify the explanation of the battery charging system of the invention, the circuits used for charging with the *trickle charging mode* will be first described.

FIGURE 1 shows the charging system connected for operation during the trickle-charging mode. The oscillator transistor 21 has normally applied thereto through control lead 35 a bias which prevents its oscillations. The cell voltage of the battery 11 will decay to a lower than desired level after its cells have been fully charged. To maintain the battery cells fully charged there is provided a trickle-charge control or sensing circuit device 33 which is connected through two sensing leads 41 to the two end terminals 11–1, 11–2 of the battery 11. As an example, FIGURE 2 shows one form of such sensing circuit 33. It comprises a semi-conductor junction transistor 37 operating as an oscillator or sensing transistor having its emitter and collector connected through a resistance 38 and a rectifying junction diode 39, respectively, to the positive (+) and negative (—) sensing leads 41, respectively, leading from the positive and negative battery terminals 11–1, 11–2.

It is assumed that the transistors shown are of the PNP type. If an NPN transistor is used the polarities of its circuit connections are reversed in a conventional way.

In the sensing circuit of FIG. 2, a Zener diode 42 of selected breakdown voltage is connected between the sensing transistor emitter of transistor 37 and the negative sensing lead 41 (—). The base of sensing transistor 37 is connected to an intermediate junction of two resistors 43, 44 which are serially connected between the two battery sensing leads 41. Resistance 43 is variable for adjusting the bias applied to the base of transistor 37 and determining in conjunction with Zener diode 42 the D.C. (direct current) voltage developed between control lead 35 extending from collector of sensing control transistor of sensing means 33 and its (—) battery sensing lead 41. The sensing circuit shown also includes a capacitor connected between sensing lead 41 (+) and sensing transistor base and another capacitor between the same sensing lead 41 (+) and collector of the sensing transistor 37. A diode 39 is connected between the transistor collector and negative sensing lead 41 (—). The transistorized battery voltage sensing circuit 33 just described is of a known type and its parameters are chosen in a known way to respond to changes in the battery voltage from fully charged battery voltage to a selected lower battery voltage for delivering through its control leads 35 and 35–1 a corresponding sensing control output. In accordance with the invention, the parameters of such battery sensing circuit 33 are chosen to normally apply through its control leads 35, 35–1 an oscillation blocking bias to the transistor 21 of the constant-current charging oscillator as long as the battery voltage is at a predetermined high voltage level, and to remove the blocking bias from transistor 21 and start oscillations of its constant-current transistor oscillator 20 and continue charging until the sensing circuits 33 responds to the restoration of the predetermined high battery voltage level.

In the sensing control circuit of FIG. 2, the voltage dividing resistors 43, 44 and 38 in combination with the voltage of Zener diode 42 apply to the electrodes of sensing transistor 37 a difference of voltage which causes transistor 37 to conduct current as the battery voltage applied by input leads 41 rises above the reference voltage of Zener diode 42 so that when the battery voltage is above a predetermined level, for instance above 26.2 volts, the circuit of control lead 35 applies a positive blocking bias current between base and emitter of oscillator transistor 21 to block or cut-off current flow therethrough. When the battery input voltage at leads 41 drops in relation to the control voltage of Zener diode 42, the circuit of control lead 35 applies instead a negative on-current bias between the base and emitter of oscillator transistor 21 so that it shall start its battery charging oscillations as described later. In other words the control voltage of Zener diode 42 connected across the emitter and collector of sensing or regulating transistor 37 is compared by the control or regulating circuit 33 with the voltage across the battery terminals 11–1, 11–2 and in response to a relative drop in the battery voltage the sensing circuit 33 starts the operation sequence of the charging oscillator 20. Thereafter in response to a relative rise of the battery voltage to the desired level, sensing circuit 33 stops the operation of charging oscillator 20, being started again in response to such aforesaid drop of the battery voltage.

As an example, for the referred to specific aircraft battery, the sensing circuit 33 of FIG. 2 will start the charging oscillator 20 and keep recharging the battery 11, if its sensing leads 41 sense battery voltage drop below 26.2 volts and will stop the oscillations of charging transistor 21 after the sensed battery voltage rises above 26.2 volts.

Further features of the charging system of FIGS. 1 and 2 will be explained in connection with the following description of the trickle-charging mode.

The breakdown voltage of Zener diode 42 of trickle-mode sensing circuit 33 (FIG. 2) is so chosen in relation to the voltage applied by its battery voltage sensing leads 41 to the electrodes of sensing transistor 37 as to apply through control lead 35 which includes resistance R5 and junction diode 46 an oscillation cut-off bias to oscillator transistor 21 of the charging circuit 20 and prevent its battery charging oscillations. The parameters of this sensing circuit 33 (FIGURE 2) are chosen in a conventional manner so that in response to a drop of the battery voltage across sending leads 41 below predetermined lower voltage, for instance, below 26.2 volts, it removes through its control lead 35 the oscillation cut-off bias from charging oscillator transistor 21 causing oscillator circuit to resume its battery charging oscillations.

The charging control or regulating oscillator 20 operates as follows:

It is assumed that the rectified D.C. voltage impressed by rectifier 17 between positive charging conductor 14 and minus rectifier terminal 18 (—) is sufficiently higher than the voltage of the battery 11 for supplying thereto the required charging current and that the circuit of charging oscillator 20 is biased for continuing its oscillation cycles. Since the resistance between emitter and collector of oscillator transistor 21 is never infinite, some small D.C. current will flow between its emitter and collector through the circuit from (+) rectifier lead 14 through battery 11, the primary winding 24 of saturable core transformer 23, thence through emitter-collector of transistor 21 to (—) rectifier charging lead 15 (—), making one end of primary transformer winding 24 more negative relatively to its other end. The windings of the transformer 23 are so connected that such rising D.C. in its primary winding 24 makes dotted end of its secondary winding 25 more negative thereby increasing the negative base to emitter bias of transistor 21 and increasing its emitter collector current. The so increased emitter collector current of transistor 21 further increases the direct current through transformer primary winding 24 which in turn further increases the negative base bias and further increases this transistor emitter-collector current. This action causes rapid cumulative increase of the flow of charging D.C. current to the battery 11 through this battery charging circuit which includes primary transformer winding and emitter-collector of transistor 21. In FIG. 1-A the full-line curve pulses show the charging current flowing in primary transformer winding 24 as a function of time, and the corresponding time-correlated curve pulses of FIG. 1-B show the bias current applied by the secondary transformer winding 25 to the base-emitter of transistor 21 as a function of time.

The hereinabove described rise of charging input current is very rapid and is indicated by the vertically rising left side of each charging current pulses marked ON in FIG. 1-A. This current rise continues until the emitter-collector of transistor 21 become a closed switch, i.e., is in saturation. The constant charging current continues to flow until the current through primary transformer winding 24 has magnetized its core along the hysteresis loop to saturation. Thereupon the core flux of transformer 23 decreases or collapses to the remanent magnetizing level of the hysteresis loop thereby inducing in transformer secondary winding 25 on oppositely directed voltage which supplies the base-emitter of transistor 21 current cut-off bias which makes the base positive relative to the emitter and starting the OFF time of the battery charging oscillator cycle. This condition is indicated in FIG. 1-B by the decaying current spike in the secondary transformer winding 25 at the end of the ON time period and the steep drop of the ON charging current at the right end of each ON current pulse in FIG. 1-A. During the OFF time the flux energy stored in transformer core 23 is discharged by current in its secondary winding 25 through its connection to capacitor 36 which is completed by the leakage resistance between the emitter and base of the transistor 21. The OFF time ends when the charge on capacitor 36 starts applying forward bias to the base emitter circuit of oscillator transistor 21 turning on or starting the next of a continuing succession of similar just described oscillating cycles of battery charging oscillator circuit of transistor 21. Each such oscillating cycle having an ON time during which a charge current pulse is delivered to battery 11 followed by an OFF time during which the charging current is interrupted by the controlled regulating action of the oscillating transistor 21. During the ON time of each charge cycle diode 38 protects the secondary transformer winding 25 from being subjected to inadvertent potential reversals. As soon as the battery 11 has been so recharged to the desired level, for instance, to 26.2 volts for the particular battery, this condition is sensed by the sensing leads 41 of the sensing circuit means 33 (FIG. 2) which now again applies through the circuits of its control lead 35 a cut-off bias to the oscillator transistor 21 stopping the previously started charging sequence. The next similar recharging operation is started when the sensing leads 41 again sense a drop of the battery voltage below 26.2 volts (or other required normal charged battery voltage). As an example with the specific charger for the specifically described battery of FIG. 1, good trickle-charge conditions are secured with the sensing device 33 turning on the charging circuit 20 every 10 to 30 seconds for two seconds to keep the floating battery 11 fully charged.

Without thereby limiting the scope of the invention, and as an example only, the specific practical charging constant-current system described above in connection with FIG. 1, good results are obtained with a charging oscillation cycle wherein the ON charge pulse of 10 milliseconds is followed by an OFF time of 6 milliseconds, and the abrupt rise and drop of each ON current pulse is completed in 200 microseconds.

An oscillator charging system described above in connection with FIGS. 1-2 will assure constant current charging of the battery 11 irrespective of any rise or drop of the voltage of the charging current supply. For instance, if the supply power voltage rises, more charging current will flow in the primary transformer winding 24, producing stronger core magnetization of transformer 23 causing the core to become saturated in less time and reducing the "ON" time length of the oscillator cycle. Although the peak current of each charging pulse is increased, the "ON" time duration of each charge cycle is correspondingly reduced resulting in an average constant charge current into battery 11 notwithstanding the rise in the supply voltage. A drop of the supply line voltage, will reduce the peak of the magnetizing current, reducing core magnetization thereby increasing the time required for transformer core saturation and increasing the "ON" time of each charge oscillator cycle, resulting again in an average constant charge current into the battery notwithstanding the drop of the line voltage.

Below are described further features of the circuits associated with the charging oscillator 20 and its associated control and sensing circuit 33. The diode 36–1 which is in series with emitter-collector of transistor 21 and the transformer secondary winding 25 is chosen to have sufficiently higher impedance than the emitter-collector to absorb the voltage peaks of the current spikes in the secondary transformer winding 25 at the start of each current OFF time. The diode 31 across the emitter-collector of oscillator transistor 21 protects oscillator transistor 21 from current spikes induced by leakage reactance of power supply transformer 16, when current flow through transistor 21 is stopped at the end of the ON time of each charging oscillator cycle. Diode 46 in oscillator control circuit 35 protects sensing transistor 37 against damage by current spikes in the charging oscillator circuits; and also blocks reverse current between collector and base sensing transistor 37. The diode 39 between collector of sensing transistor 37 and (—) 41 sensing lead protects this transistor against induced current spikes impressed thereon upon opening this type of sensing circuit when it is used to selectively energize and deenergize the coil of a control relay of control circuits that might be used for controlling the number of battery cells of the charging circuit.

The charging current supplied by oscillator 20 during the trickle mode is relatively smaller than the charging current required to recharge the battery 11 after current has been drained therefrom by a load. Before proceeding with the further description of the charger control circuits, there will first be described additional features of the constant-current charging oscillator system shown in FIGS. 1–2.

For charging the battery at a constant current rate with greater average charging current, the circuits of charging oscillator 20 are provided with means for varying or adjusting the length of the ON time period and of the OFF time period of the charging oscillator cycle or both.

FIG. 1 shows one manner for increasing or decreasing the ON time of the oscillator charging cycle. Referring to time function diagrams FIGS. 1–A and 1–B it is assumed that it is desired to increase the duration of the ON time current pulses from the shorter full-time current pulses to the linger dash-line current pulse, which are shown for sake of clarity only as being of slightly different peak levels, although it is assumed that all current pulses have the same peak level. During the ON time of the charging cycle a D.C. current pulse flows in the circuit including emitter to collector of oscillator transistor 21, adjustable resistor R3, diode 36–1 and secondary transformer winding 25 in a direction which reduces magnetizing action of the charging current pulse through the primary transformer winding 25. By adjusting or setting the resistance of resistor R3 the resistance of this core demagnetizing circuit is selectively set so the rate at which the transformer core is being magnetized to saturation may be increased or decreased thereby adjustably setting the time length of the ON current time of each charging oscillating cycle and thereby adjustably setting the average constant charging current supplied to the battery 11.

It should be noted that in the current-time diagrams of FIGS. 1A and 1B the (+) current direction of FIG. 1B marked with a (+) arrow which oppositely directed to current indicating (+) arrow in FIG. 1A. The relative current directions are similarly indicated by (+) and (—) arrows in correlated FIGS. 1C and 1D.

FIG. 1 also shows one manner for increasing the OFF time of the battery charging oscillator cycle. Correlated current-time function curves FIGS. 1C and 1D (which are analogous to FIGS. 1A and 1B) show in full-lines the current pulses in the primary and secondary transformer windings 24 and 25 under prevailing operating conditions. It is assumed that it is desired to increase the average constant charging current supplied to the battery 11 by decreasing the OFF time of the charging cycle without changing its ON time, namely to the condition indicated by the dash-line current pulses of FIGS. 1C and 1D. This is done by changing or adjustably setting the resistance of the current flow circuit connected to the secondary transformer winding 25 during the period when its current spike flows therethrough.

For the trickle charge mode indicated in the specific example of FIGS. 1 and 2, the peaked current pulse induced in the secondary transformer winding 25 will flow from its then positive dot end through closed relay contacts 55BC, diode 34, charge conductor 14, battery 11, return charge conductor 15 and back through primary 24 to secondary transformer winding 25 which has more winding turns than the primary. By including in this spike-current circuit of transformer secondary winding 25 a selected time setting or an adjustably variable resistance the time during which this spike current pulse decays to zero may be made longer or shorter. In the example of FIG. 1, this spike-current circuit includes a variable resistor 32–1 between the closed relay contacts 55BC and the diode 34 for so setting or adjustably increasing or reducing the OFF time of the above described battery charging cycle of oscillator 20, by setting or adjusting resistance 32–1.

The charging oscillator 20 is also provided with OFF time setting control for the main and topping charge sequences of charging system during which relay switch 55BC is open and switch 55DE is closed instead by operation of herein described and shown integrating or timing means 58. As an example, under such main or topping charge sequences of charging oscillator 20 closed relay switch 55BC completes across the secondary transformer winding 25 a spike-current flow circuit from its then dot (+) terminal through rectifier diode 38 variable resistance R4, the setting of which controls the duration of the OFF time of each oscillator charging cycle.

A charging system of the type described above in connection with FIGS. 1–2 may be used for providing any desired constant-current level of charging current supplied to the battery by utilizing the level changes in the charging current pulses passing through oscillator transistor 21 for applying directly or after amplification bias current for one or more transistor-switch controlled charging circuit paths connected between the (—) battery charge conductor 15 and the (—) input supply conductor 18 of rectifier system 17. As an example, an emitter-base follower transistor 21–1 is connected to follow the charge-pulse cycles of charging oscillator transistor 21 to pass additional charging current from battery return lead 18 (—) to negative rectifier input lead during the ON time of each oscillator charging cycle when oscillator transistor 21 is biased to pass charging current through its emitter-collector from battery return lead 15 to rectifier (—) conductor 18 (—).

As stated above the charging system of the invention is also provided with sensing means responsive to drains of load current from the battery for starting a main charging sequence followed by a topping charging sequence under regulating control of charge totalizing or timing means to restore the battery to the desired fully charged condition. One example of such regulated main and topping charge control will now be described.

Reference is made to the example of the invention shown in FIGS. 1–2 and to the previous description of the charge totalizing or timing means 50 thereof. The specific example shown has drain sensing circuit means 33—analogous to those described in connection with FIG. 2—with similar battery sensing leads 41, 41 connected to the battery terminals 11–1, 11–2. The control voltage of the Zener diode 42 of sensing circuit 33–2 is compared therein through its sensing leads 41 with the voltage across the battery terminals 11–1, 11–2 so that in response to the voltage of the drained battery dropping to 23.75 volts (in the specific example), the sensing transistor switch 37 will energize through its output leads 35, 35–1 its relay coil 76 and close its previously open switch contacts 76AB. The closed relay contacts 76AB energize the relay coil 56 of the integrating circuit 50 thereby closing its relay contacts 56AB which close timer relay contacts 56AB thereby energizing voltage divider resistors 65, 66. The energized resistor 65, energizes charge totalizing timer motor 51 through circuit from divider portion 67, closed relay contacts 78CB, motor 51 back through closed relay contacts 78EF to (+) rectifier lead 63, and causing motor 51 to run for predetermined time. On starting, the timer 58 actuates its timer switch 52 to open its contacts 52AB and close its contacts BC thereby energizing timer relay coil 55 to open its closed contacts 55BC and close its two contacts 55DE. The so opened timer relay contacts 55BC open the circuit from biasing conductor 35 of sensing device 33 which normally apply cut-off current bias to base of oscillator transistor 21 thereby starting its battery charging oscillation cycles as described above. In addition the so closed timer relay contacts 55DE of relay 55 complete the circuit through diode 38 and resistor R4 connected across secondary transformer winding 25 of transistor oscillator 20 for shortening the OFF time of each battery charging oscillation cycle and correspondingly increasing the average constant current charge supplied to battery 11.

The charge controlling timer or integrating motor is designed to continue the charging operation for the time required by the load conditions to which the battery is being subjected. As an example in the specific system hereabove described, the timer control circuit may be designed to rotate the timer motor 51 during a main charging sequence of 3 minutes and during the following topping sequence of 1½ minutes for the maximum duration of a continuous charging period. If the battery is still below the required full-charge voltage, such as 23.75 volts, the sensing means 33-2 will start another such continuous charging operation.

It is assumed that sensing means 33-2 in response to the above described operation has just started the energization of timer motor 51 and thereby the main charging sequence of oscillator 20. Such so started main charging operation may continue until the end of the main timer motion or integrating action, whereupon the second timer cam actuates timer switch 52 to close its contacts 52 thereby energizing timer relay 55 causing it to open its BC contacts, close its BC contacts and DE contacts. The timer motor 51 is now energized by the full rectified voltage across D.C. supply leads 63, 64 with reversed polarity to rotate in reversed direction and return to its initial position while keeping closed its timing contacts 52BC until completion of the shorter topping charge, with the charge-totalizing timer 58 and its contacts returned to their normal standby position shown in FIG. 1. If before completion of the full operating period of the above described charge totalizing or timing means 50 the constant charging current supplied to battery 11 has restored it to fully charged condition, full-charge sensing means 33-3 responds to the raised fully-charged battery voltage and cuts off further charging. The full charge sensing means 33-3 has a sensing circuit similar to that shown and described above in connection with FIG. 2 which responds to the relation of the predetermined control voltage of its Zener junction diode 42 to battery voltage sensed by its sensing leads 41 to energize the sensing means relay coil 78 in response to sensed battery voltage being restored to 28.5 volts of the so recharged battery for the specific example described above. The sensing circuit 33-3 is similar in design and operation to sensing circuit 33-2 described above. In the specific example here described, when the voltage of the charged battery reaches to 28.5 volts, the sensing means 33-3 responds to such voltage rise and energized its relay coil 78. The energized operated relay coil 78 closes its two sets of switch contacts 78BA and 78ED and opens its contact sets 78BC and 78EF which control the connections of the totalizing timing motor 51 to its supply circuit. The so changed connections of timer motor 51, reverse the direction of and increase to twice the speed the return motion of timer motor 51 in the same way as is accomplished by the operation of timer switch 53 when it is actuated to cause return movement of the timer cams and cause the still operating charge control means 50 to supply to the battery 11 a topping charge of half the magnitude of the main charge supplied to the battery 11 during the preceding shortened sequence of the main charging operation. Upon returning to their initial positions the timer means 58 restore the standby circuit conditions as shown in FIG. 1.

The Truth Table of FIG. 3 shows the connections established by the different sets of switch control contacts of the charging system of FIG. 1 for each of the different operating conditions described herein. In this Table the first column lists in successive lines the designations of the different relay and timer switch contact pairs that are closed and opened respectively under different operating conditions. The second table row T1 indicates the conditions of each different contact pair the trickle charge mode, the letter "O" indicating the open condition, the letter "X" the closed condition of the respective different contacts of the first column. Row T7 for back to trickle charging corresponding to row T1.

In an analogous way, the operating condition of the different contacts of the first column are indicated in column T2 for starting a charging operation, in column T3 for the main charging mode, in column T6 for the topping charge, and in column T5 for a forced reversal of the timer action, when desired.

I claim:

In a system for recharging a battery with opposite battery poles with a constant current from a supply circuit having two opposite-polarity direct current supply conductors, a transformer having primary and secondary windings, and a magnetic core interlinked with said windings, said core being saturated upon passing saturating current through said primary windings, a transistor having three unlike transistor electrodes consisting of a base, emitter and collector, a charging circuit connected to said two supply conductors having one charge conductor connected to one of said battery poles and an opposite polarity other charge conductor connected to the opposite battery pole and causing saturation of said core in response to rise of battery charge current in said circuit to a predetermined saturation level, correlated to the average constant charging current supplied to said battery, said opposite charge conductor including serially with said primary windings the emitter and collector of said transistor, a selective bias circuit serially including said secondary windings and connected between the base and one of said other transistor electrodes and causing said transistor to be successively on-biased in response to said charging current being below said saturation level and to be off-biased and stop charging current in response to said charging current being below said saturation level and causing the circuits of said transistor to undergo continuous charging current oscillations and pass charging current to the battery through said opposite conductors in the on-time of each oscillator cycle, sensing means linked to said battery and to said charging circuit for applying through said bias circuit normal off-bias to said transistor and normally cut-off charging of said battery through said charging circuit, said sensing means including means responsive to a drop of the battery voltage to a predetermined lower voltage level for causing said bias circuit to start and continue said charging oscillations and charge said battery, said sensing means being also responsive to said battery voltage rising to a predetermined high voltage level to restore normal off-bias applied to said transistor and stop said charging oscillations.

References Cited by the Examiner
UNITED STATES PATENTS 2,964,693  12/1960  Ehret _____ 323—22

MAX L. LEVY, *Primary Examiner.*